US012630192B2

(12) United States Patent   (10) Patent No.:    US 12,630,192 B2
Oltmann et al.                  (45) Date of Patent:       May 19, 2026

(54) METHOD FOR OPERATING A VEHICLE EQUIPPED FOR AN AUTOMATED DRIVING OPERATION

(71) Applicant: MERCEDES-BENZ GROUP AG, Stuttgart (DE)

(72) Inventors: Volker Oltmann, Calw (DE); Markus Raab, Kirchhardt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 148 days.

(21) Appl. No.: 18/570,685

(22) PCT Filed: May 17, 2022

(86) PCT No.: PCT/EP2022/063251
§ 371 (c)(1),
(2) Date: Dec. 15, 2023

(87) PCT Pub. No.: WO2022/263080
PCT Pub. Date: Dec. 22, 2022

(65) Prior Publication Data
US 2024/0262389 A1      Aug. 8, 2024

(30) Foreign Application Priority Data
Jun. 18, 2021      (DE) ...................... 10 2021 003 154.7

(51) Int. Cl.
*B60W 60/00*          (2020.01)
*B60W 50/00*          (2006.01)
(Continued)

(52) U.S. Cl.
CPC .. *B60W 60/00186* (2020.02); *B60W 50/0225* (2013.01); *B60W 50/029* (2013.01);
(Continued)

(58) Field of Classification Search
CPC ............. B60W 50/02; B60W 50/0205; B60W 50/029; B60W 2050/0292; B60W 50/04;
(Continued)

(56) References Cited

U.S. PATENT DOCUMENTS 10,527,434 B2    1/2020  Izumi
11,608,080 B2    3/2023  Oltmann et al.
(Continued)

FOREIGN PATENT DOCUMENTS

DE         102013213171 A1     1/2015
DE         102014014120 A1     4/2015
(Continued)

OTHER PUBLICATIONS

International Search Report and Written Opinion mailed Sep. 6, 2022 in related/corresponding International Application No. PCT/EP2022/063251.
(Continued)

*Primary Examiner* — Angela Y Ortiz
*Assistant Examiner* — Aaron K McCullers
(74) *Attorney, Agent, or Firm* — PATENT PORTFOLIO BUILDERS PLLC

(57) ABSTRACT

A method for operating a vehicle equipped for an automated driving operation. In a regular operating mode of the automated driving operation the vehicle is guided to a target position in an automated manner by a main control device, and in an emergency operating mode of the automated driving operation, it is moved into a safe stopping position in an automated manner by an auxiliary control device. A functional readiness of the auxiliary control device is continuously checked by the main control device. Depending on the checked functional readiness, a decision is made regarding whether a release for the automated driving operation should be granted or withdrawn. The automated driving
(Continued)

operation is exclusively activated when the release has been granted, and is deactivated when the release is withdrawn.

3 Claims, 1 Drawing Sheet

(51) Int. Cl.

| | |
|---|---|
| *B60W 50/02* | (2012.01) |
| *B60W 50/029* | (2012.01) |
| *B60W 50/04* | (2006.01) |

(52) U.S. Cl.
CPC ..... *B60W 50/04* (2013.01); *B60W 2050/0072* (2013.01); *B60W 2556/00* (2020.02)

(58) Field of Classification Search
CPC ............... B60W 50/14; B60W 60/001; B60W 60/0015; B60W 60/00186; B60W 60/005; B60W 60/0051; B60W 60/0053; B60W 60/0059; B60W 60/007; B60W 2556/00
USPC ........ 701/1, 25, 29.1, 29.2, 31.6, 31.7, 32.7, 701/32.8, 33.5, 34.4, 52, 515
See application file for complete search history.

(56) References Cited

U.S. PATENT DOCUMENTS

| | | | |
|---|---|---|---|
| 2015/0251676 A1* | 9/2015 | Golden ................... | B61L 27/20 |
| | | | 701/19 |
| 2017/0248951 A1 | 8/2017 | Perkins et al. | |

| | | | |
|---|---|---|---|
| 2017/0305420 A1 | 10/2017 | Desens et al. | |
| 2018/0059671 A1* | 3/2018 | Sogen ................... | G08G 1/0145 |
| 2020/0331493 A1* | 10/2020 | Wu ..................... | B60W 60/0011 |
| 2021/0179122 A1* | 6/2021 | Zhu ..................... | B60R 16/0232 |
| 2021/0199463 A1* | 7/2021 | Kitahara ............ | G01C 21/3815 |
| 2021/0241028 A1* | 8/2021 | Hojin .................. | B60W 30/143 |
| 2021/0269063 A1* | 9/2021 | Lee .................. | B60W 60/00186 |
| 2021/0341919 A1* | 11/2021 | Kawahara ............ | G05D 1/0231 |
| 2021/0387632 A1 | 12/2021 | Sugawara et al. | |

FOREIGN PATENT DOCUMENTS

| | | | |
|---|---|---|---|
| DE | 102015003124 A1 | 9/2016 | |
| DE | 102016226308 A1 | 7/2018 | |
| DE | 102017011808 A1 | 6/2019 | |
| DE | 102018217403 A1 | 4/2020 | |
| JP | 2016020125 A | 2/2016 | |
| JP | 2016076001 A | 5/2016 | |
| JP | 2016525038 A | 8/2018 | |
| JP | 2020059350 A | 4/2020 | |
| JP | 2020091528 A | 6/2020 | |
| JP | 2021014239 A | 2/2021 | |
| WO | 2020075477 A1 | 4/2020 | |
| WO | 2020110792 A1 | 6/2020 | |

OTHER PUBLICATIONS

Office Action created Feb. 25, 2022 in related/corresponding DE Application No. 10 2021 003 154.7.
Office Action dated May 29, 2024 in related/corresponding JP Application No. 2023-577592.

\* cited by examiner

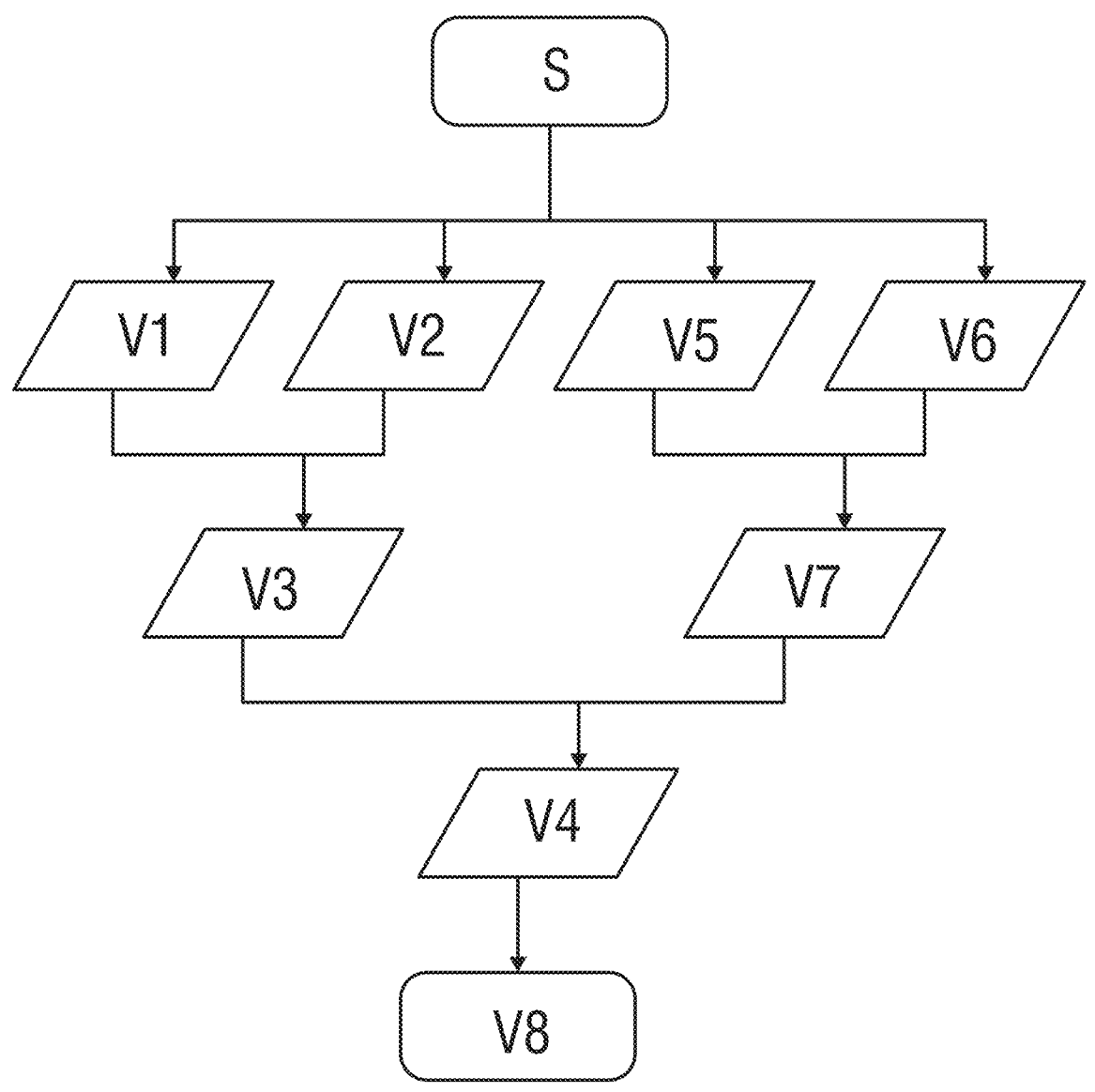

METHOD FOR OPERATING A VEHICLE EQUIPPED FOR AN AUTOMATED DRIVING OPERATION

BACKGROUND AND SUMMARY OF THE INVENTION

Exemplary embodiments of the invention relate to a method for operating a vehicle equipped for an automated driving operation.

DE 10 2015 003 124 A1 describes a method for operating a vehicle in an automated driving operation. During normal function of the automated driving operation, an intended emergency operation trajectory is continuously determined and stored, which, after at least one error arises, should be used as the basis for an automated trajectory control of the vehicle. If it is detected that the at least one error has arisen, an emergency operating mode is activated, in which the automated trajectory control of the vehicle is initiated and is carried out for a pre-determined period of time and/or until the vehicle comes to a standstill according to the intended emergency operating trajectory stored before the at least one pre-determined error arises, if and as long as a driver of the vehicle does not take over control of the vehicle.

In addition, a method for regulating the movement of a vehicle in an automated driving operation and a device for carrying out the method are known from DE 10 2017 011 808 A1. The method provides that the automated driving operation can be switched from a regular operating mode, in which the vehicle is guided in an automated manner to a pre-determined target position, to an emergency operating mode, in which the vehicle is guided in an automated manner to an emergency stopping position. The regulation is carried out by a main control device in the regular operating mode and by an auxiliary control device in the emergency operating mode. The automated driving operation is switched from the regular operating mode to the emergency operating mode if it is determined that the main control device is functionally impaired in the regular operating mode. The regulation is carried out in the regular operating mode based on a regular intended trajectory leading to a target position, which is continuously determined by the main control device in the regular operating mode. The regulation in the emergency operating mode is carried out based on an intended emergency operation trajectory stored in the auxiliary control device and leading to the emergency stopping position, the intended emergency operation trajectory having been determined by the main control device in the regular operating mode before the operating mode was switched into the emergency operating mode and fed to the auxiliary control device for storage. In the regular operating mode, in addition to the intended emergency operation trajectory, a lane course associated with the intended emergency operation trajectory of a lane being driven in by the vehicle is determined and fed to the auxiliary control device for storage. In addition, it is provided that the intended emergency operation trajectory and the associated lane course are determined in a vehicle-fixed coordinate system of the main control device. In the emergency operation mode, the lane course of the lane driven in by the vehicle is determined in a vehicle-fixed coordinate system of the auxiliary control device, and in the emergency operation mode, a deviation between the coordinate systems of the main control device and of the auxiliary control device is compensated for based on the lane course of the lane stored in the auxiliary control device and the lane course of the lane determined by the auxiliary control device.

Exemplary embodiments of the invention are directed to a method for operating a vehicle in the automated driving operation.

A method for operating a vehicle equipped for the automated driving operation provides that in a regular operating mode of the automated driving operation, the vehicle is guided to a target position in an automated manner by a main control device, and in an emergency operating mode, is moved into a safe stopping position in an automated manner by an auxiliary control device. According to the invention, a functional readiness of the auxiliary control device is continuously checked by the main control device and, depending on the checked functional readiness, a decision is made regarding whether a release for the automated driving operation of the vehicle should be granted or withdrawn, wherein the automated driving operation is only activated when the release has been granted, and is deactivated when the release is withdrawn.

By applying the method, a maximum availability of a fallback path function of the vehicle, i.e., an availability of the emergency operating mode, can be achieved with comparatively little technical complexity. An availability of the automated driving operation is thus not or imperceptibly limited.

Dead reckoning data and camera lane data are required for the fallback path function, such that no redundant sensors, in particular environment sensors, are required for the emergency operating mode and the regular operating mode.

By means of the method, it is permitted to adjust a desired quality or availability regarding the automated driving operation. The regular operating mode of the automated driving operation can thus only be activated if the fallback path function, and thus the emergency operating mode for moving the vehicle into the safe stopping position, is available.

In one embodiment of the method, in order to check the functional readiness of the auxiliary control device, it is checked whether data used by the auxiliary control device to locate the vehicle when guiding the vehicle fulfils pre-determined quality requirements.

The quality requirements relate, in particular, to a lane detection, i.e., to a detection of a lane marking of a lane of the vehicle, such that the vehicle can be transferred into the safe stopping function. If the data does not correspond to the pre-determined quality requirements, then the vehicle is decelerated to a greater extent than normal when moving into the safe stopping position, such that the vehicle is brought to a standstill at comparatively short-notice, and thus quickly. It can thus substantially be avoided that the vehicle represents a danger for further traffic participants in an environment of the vehicle.

In a development, dead reckoning data and determined camera lane data are checked regarding the pre-determined quality requirements by the main control device. Using the camera lane data, a match between a recognized lane and an actual lane is determined, and a probability is determined so that it is possible to move the vehicle into the safe stopping position. When determining the probability with regard to the match, for example, features such as a uniqueness of lane features in the image, a detection history and/or a match with a result of an independent lane recognition algorithm can be taken into account.

The dead reckoning data is data which is, for example, present from a so-called coupled navigation system. By means of statistical methods, position data of a satellite-supported position determining unit is combined with inertial sensor data of the vehicle, for example accelerations, rotation rates, e.g., around a longitudinal, transverse and/or vertical axis of the vehicle, and further vehicle state data, such as wheel rotation information and wheel angle, e.g., a steering angle of a front axle and optionally a rear axle, in order to obtain as precise and reliable a location of the vehicle as possible.

In a further embodiment of the method, it is decided whether to grant the release or withdraw the release depending on the fulfilment of the pre-determined quality requirements. In particular, depending on the camera lane data and the dead reckoning data, the availability of the fallback path function is determined, and it is decided whether an automated driving operation of the vehicle is possible in the regular operating mode.

Decision criteria depending on a limit speed are predetermined in relation to a current driving speed of the vehicle. At a comparatively low driving speed of the vehicle, and thus if the limit speed is fallen short of, the release of the automated driving operation is granted if the dead reckoning data or the camera lane data fulfilling the quality requirements is available. In other words, if the limit speed is fallen short of, the automated driving operation is released if the dead reckoning data or the camera lane data fulfils the pre-determined quality requirements.

In a possible development, if the limit speed is exceeded, the automated driving mode is released if both the dead reckoning data and the camera lane data fulfil the pre-determined quality requirements.

Exemplary embodiments of the invention are explained in more detail in the following with reference to a drawing.

BRIEF DESCRIPTION OF THE SOLE DRAWING

Here:

The sole FIGURE schematically shows a sequence of a method for deciding on an activation of an automated driving operation.

DETAILED DESCRIPTION

The single FIGURE shows a sequence of a method for deciding on an activation of an automated driving operation in a vehicle not depicted in more detail.

An assistance system in the vehicle for the automated driving operation, in particular for the highly automated driving operation, is connected to a plurality of information sources, in order to regulate the vehicle comparatively safely in its lane.

These information sources are sensors, in particular such as cameras, stereo cameras, lidar-based sensors, radar-based sensors, ultrasound-based sensors, long-range radar sensors, multi-mode radar sensors, panoramic view sensors, digital maps, inertial sensors, driving state sensors, satellite-supported position determining units, and reversing cameras.

The assistance system comprises a main control device and an auxiliary control device. The main control device continuously determines an intended trajectory, along which the vehicle is guided to a target position in a regular operating mode of the automated driving operation. In addition, an intended emergency operation trajectory is continuously determined by the main control device, along which intended emergency operation trajectory the vehicle is moved into a safe stopping position in an emergency operating mode of the automated driving operation. The intended emergency operation trajectory is determined during the regular operating mode and is stored in an auxiliary control device, which is also described as a replacement control device. The vehicle is guided to the target position by a trajectory regulation by the main control device, and the vehicle is guided to the safe stopping position by a trajectory regulation by the auxiliary control device.

The main control device thus sends a driving specification to the auxiliary control device, such that the auxiliary control device takes over a driving task with regard to the vehicle in the event of a failure of the main control device, and controls said vehicle corresponding to the driving specification, i.e., corresponding to the intended emergency operation trajectory. The auxiliary control device can be a control device of a driving dynamics controller of the vehicle.

Only one camera with a lane recognition and sensor data for dead reckoning, in particular dead reckoning data, are available to the auxiliary control device for carrying out the driving specification. In the following, a method is described for how a comparatively highly available fallback path function, and thus the emergency operation mode, can be achieved with relatively high quality using camera lane data and the dead reckoning data.

In the event that the fallback path function is only available if camera lane data and dead reckoning data exist, the availability of the automated driving operation would be relatively significantly limited and continuously deactivated, because there might be continuous interruptions in the recording of the camera lane data and the dead reckoning data.

The fallback path function represents a fallback solution in the automated driving operation. For this reason, it is only possible to activate the automated driving operation of the vehicle if the fallback path function, i.e., the emergency operation mode, is ready and is correspondingly available. A readiness of the fallback path function is granted to the main control device by means of a release of the automated driving operation.

If operating conditions are changed, the fallback path function can withdraw the release of the automated driving operation. The availability of the fallback path function is evaluated in the main control device, although the fallback path function is implemented in the auxiliary control device. The evaluation by the main control device is possible because signals for evaluating a functional readiness of the auxiliary control device and further required components are also available to the main control device.

The fallback path function uses dead reckoning data or camera lane data to locate the vehicle. If the emergency operation mode of the vehicle is activated, and neither dead reckoning data nor camera lane data are available to the auxiliary control device, the vehicle is decelerated comparatively significantly, in order to bring the vehicle to the standstill, in particular to the safe stopping position, as quickly as possible.

The camera of the vehicle, in particular in the form of a stereo multi-purpose camera, delivers continuously recorded distances of a vehicle central axis in relation to a left and to a right lane marking, which delimit a lane of the vehicle. In addition, information such as a recorded lane structure is determined using recorded camera lane data. The lane structure describes a structure that has been recognized, e.g., lane markings in the vehicle's lane, the neighboring lane, a lane edge, or a raised road boundary, for example a crash barrier. This lane structure is made available to the auxiliary control device as an encoded fictional lane.

In addition, by means of its camera lane data, the camera makes available quality signals, a width of the recorded lane and a detection status, in particular in relation to a recorded lane or a chronologically extrapolated lane.

The vehicle can be guided in the automated driving operation, in particular in the emergency operation mode, using a recorded lane marking or, in the ideal case, using lane markings recorded on both sides.

Recording a lane requires corresponding structural features to be present and to be able to be identified in recorded environment conditions using recorded image data of the camera. In addition to missing lane markings in a lane, glare and/or impairments to view, e.g., fog and/or dirt on a camera lens, can lead to impediments when recording camera lane data.

In relation to the camera lane data, quality requirements are pre-determined, wherein a quality requirement represents a probability of there being a match between the recorded camera lane data and an actual lane. For example, when determining the probability, features such as a uniqueness of lane features in recorded image data, a detection history or a match with a result of a further independent lane recognition algorithm can be used.

A signal in relation to the quality requirements is a variation from the currently displayed lateral distance from a vehicle central axis in relation to the lane marking in square meters. A further signal specifies a variation of a currently displayed yaw angle of the vehicle, i.e., a longitudinal vehicle axis in relation to lane marking tangents in the unit degrees squared. The signals for each lane marking of a left and right side are individually determined. The variations are usually derived using results of a Kalman filter.

The dead reckoning data is data which is, for example, available using a coupled navigation system. By means of statistical methods, for example a Kalman filter, position data, e.g., longitude, latitude, v-north, v-east, of a satellite-supported position determining unit is combined with inertial sensor data and further vehicle state data in order to obtain a location of the vehicle which is as precise as possible.

Accelerations and rotation rates, for example around a longitudinal, transverse and/or vertical axis of the vehicle, are determined as inertial sensor data. Wheel rotation information and wheel angles, in particular in relation to a steering angle of a front and, in some instances, of a rear axle are determined as further vehicle state data.

The dead reckoning data to be made available for vehicle regulation in the activated emergency operation mode, so that the data can be used for a trajectory regulation, and thus for the driving specification, can be used, for example, a vehicle longitudinal and transverse speed or a vehicle movement in the north and east direction, absolute or relative location points or angles and speed.

The dead reckoning data is as precise as possible if a sufficient number of satellites, in particular 10 or more satellites, are recorded, and correction data is available. If a sufficient number of satellites can be recorded to determine the position, this is described as a normal mode operation, otherwise as a bridging mode.

If the conditions for the normal mode operation are not fulfilled, the signals degrade more and more over time, the fewer satellites are present. Due to the physical circumstances, smaller deviations can arise when integrating the dead reckoning data, and thus also in the emergency operation mode, which deviations lead over time to an increasing difference from an intended position of the vehicle, in particular in its lane.

Using the parameters of the camera and of the satellite-supported position determining unit, in particular of the camera lane data and the dead reckoning data, the availability and non-availability of the fallback path function is decided in the main control device as a fallback path function preparation determination module.

If the vehicle is driving at a current driving speed that falls short of a pre-determined limit speed, the release of the automated driving operation is granted if the present camera lane data or the present dead reckoning data corresponds to pre-determined quality requirements. In a specific parameter selection, the release can also only be granted if camera lane data or the dead reckoning data is present. Above the limit speed, it is required that the camera lane data and the dead reckoning data correspond to the pre-determined quality requirements.

Because a situation for activating the fallback path function arises comparatively rarely, and is based on empirical values for detection performance of a camera for lane recognition and a precision and availability of dead reckoning data, in particular in the bridging mode, the criteria can be individually parameterized for components from suppliers of the vehicle.

The limit speed parameter is fixed or pre-determined such that a quality of a coupling of the sensor data maintains a pre-determined precision. This pre-determined precision must be maintained for a defined period of time, which in turn substantially results in a dependence on driving speed, a stopping distance, a deceleration, and a normal mode or bridging mode.

The limit speed of 40 km/h is selected if, for example, a desired transverse precision of 0.2 meters is maintained with a sigma for all scenarios, such as driving in the center of the lane, evasion, driving around a bend and/or comparatively high deceleration, and 20 seconds in the bridging mode, for example without satellite reception These parameters can ideally be set in the main control device as so-called SCN parameters.

Individual parameters for the lane can also be dispensed with, or parameters can be broadened depending on the camera resolution.

If camera lane data and dead reckoning data is available when the fallback path function is active, then the trajectory regulation is implemented by means of the camera lane data. If no camera lane data is available, the trajectory regulation is carried out based on the dead reckoning data.

An absolute precision of a result in relation to the camera lane data does not substantially alter over time, i.e., no drift arises, and the lanes also represent an orientation in relation to the vehicle positioning for people.

In a faultless system for the automated driving operation, the sensors are available as information sources. A voltage supply, in particular via a so-called backup on-board power supply, and a bus networking of the sensors is designed such that, even in the event of a failure of a main on-board power supply, these components are available for the fallback path function and in particular for the auxiliary control device. The main control device is connected to the main on-board power supply with further sensors of the vehicle.

If the opposite is the case, the main control device can fulfil the driving specification without camera lane data and dead reckoning data in the event of a failure of the backup on-board power supply until a driver takeover of the driving task, because a sufficient number of sensors, in particular an environment sensor system, of the vehicle are present.

In one embodiment of the method, the vehicle is more significantly decelerated when the emergency operating mode is activated without camera lane data and dead reckoning data, and a last recorded wheel angle of a steering of the vehicle is maintained. A compromise regarding a future course is thus reached using a current situation, and a driver intervention recognition is maintained using a steering moment applied by a driver.

As described above, the fallback path function can be implemented in the auxiliary control device, wherein the auxiliary control device can be a control device of a driving dynamics controller of the vehicle or another control device. The control device of the vehicle dynamics controller is suitable, in particular, as an auxiliary control device, as such a solution is cost-effective, no further components are required and a brake function is already implemented in the control device.

In one embodiment of the fallback path function preparation determination module, due to information from a digital map, if the latter is stored, that lane markings are missing on both sides of the lane or only on one side in one portion of the route, the automated driving operation, in particular the regular operating mode, is deactivated for this portion of the route. In addition, due to the digital map, when there is no lane recognition, it is known which route the vehicle must cover until a lane recognition is possible again, meaning that this information can be taken into account by the fallback path function preparation determination module. Because such information is present in the main control device, an allocation of the fallback path function preparation determination to the main control device is logical. A functional readiness of the camera for lane recognition in relation to the route can also be trained and learned by each vehicle with cameras, and this can be made available to a service of a computer unit which is coupled with the vehicle via data technology. It is thus possible for the digital map to be continuously updated.

The sequence of the method shown in FIG. 1 applies both to the release of the automated driving operation and to a withdrawal of this release, wherein the parameters of the conditions differ. The parameters are fixedly pre-determined values.

The method begins with a start S, and provides that the release is granted depending on the driving speed of the vehicle. At a current driving speed, which falls short of the limit speed, an availability of the camera lane data and of the dead reckoning data is determined differently than at a current driving speed that exceeds the limit speed. The availability corresponds to pre-determined quality requirements, in particular properties, of recorded signals.

At a current driving speed falling short of the limit speed, it is checked in a first method step V1 whether the camera lane data fulfils pre-determined quality requirements. In addition, in a second method step V2, it is checked whether the dead reckoning data corresponds to the pre-determined quality requirements.

If, in a third method step V3, it is determined that either the recorded camera lane data or the dead reckoning data fulfils the quality requirements, then in a fourth method step V4, the release of the automated driving operation of the vehicle for a driving speed below the pre-determined limit speed is granted, because the fallback path function is available for the automated driving operation at a current driving speed below the limit speed.

As lane markings can often be covered by other vehicles in traffic, it is also possible that only the availability of the dead reckoning data is requested when taking the quality requirements into account. This can be set with a parameter.

If the vehicle is driving at a current vehicle speed above the limit speed, of for example 40 km/h, it is determined in a fifth method step V5 whether camera lane data is available and fulfils the pre-determined quality requirements. The limit speed can be 40 km/h, wherein the limit speed can deviate comparatively significantly upwards or downwards depending on a precision of the dead reckoning data.

In a following sixth method step V6, it is checked whether dead reckoning data is available and fulfils the pre-determined quality requirements.

Then, in a seventh method step V7, it is determined whether both the camera lane data and the dead reckoning data corresponds to the pre-determined quality requirements, such that the method jumps to the fourth method step V4 and the automated driving operation is released for a driving speed which exceeds the pre-determined limit speed.

In an eighth method step V8, the release of the automated driving operation of the vehicle is then granted or withdrawn, because the conditions of the fallback path function are fulfilled or not fulfilled.

A similar process takes place for a withdrawal of the release of the automated driving operation.

The method thus provides that the automated driving operation is released or ended depending on the current driving speed of the vehicle.

In particular, if the current driving speed exceeds the pre-determined limit speed, the left lane marking and the right lane marking are detected independently of each other, such that the conditions for the left and the right lane marking can be individually checked. The conditions in relation to the camera lane data are checked.

A partial release for a lane marking is implemented if particular pre-determined parameters, in particular the quality signals specified above, are fulfilled. The release is granted if the quality signals in relation to their conditions are fulfilled, for example even for only one side.

Certain quality signals represent a measure for particular properties of the camera lane data. In particular, as described above, structural features are determined, wherein structural features stand for a structure which has been recognized, e.g., the lane marking of the vehicle's own lane on a specified side or derived from the other side or a neighboring lane or a lane edge or a raised lane boundary, e.g., a crash barrier. For example, the right lane marking can be derived from the left lane marking.

A value of the variables increases with a spacing of the lane markings from the vehicle and a quality of the information thus falls. If the lane marking of the vehicle's own lane is signaled as being recognized on the corresponding side, the release of the automated driving operation can be granted. The withdrawal of the release is implemented, for example, if only the neighboring lane or a higher lane boundary is recognized.

A quality signal represents a status of the lane recognition, and differentiates between no recognition, a current recognition, i.e., a detection of the vehicle lane, and a prediction, i.e., a result of a last lane recognition specifies lane information. If the value of these variables shows detection, then the release of the automated driving operation can be granted. The release is withdrawn if no lane is recognized.

A further quality signal stands for a width of the recorded lane, and thus of the recorded lane markings, and specifies a distance that has been detected from the vehicle to the lane markings. The larger this value is, the better the recognition, and thus a reliability and precision of the result. If, for example, the width is more than 50 meters, then the release of the automated driving operation can be granted. The release is withdrawn and a takeover request is correspondingly transmitted if the value is below 10 meters.

In particular, the release is withdrawn if one of the quality signals is not fulfilled for one or both of the lane markings delimiting the lane of the vehicle for a pre-determined period of time, for example of 7 seconds, or a pre-determined distance, for example of 200 meters.

A delay to the withdrawal of the release by the pre-determined period of time, for example of 7 seconds, or the pre-determined distance as a route-related delay is due to the fact that the camera lane data and/or the dead reckoning data can generally be recorded again after a comparatively short interruption. Ending the automated driving operation until the driving task is taken over by the driver can take longer in some instances.

The conditions for the release or for the withdrawal of the release for the automated driving operation of the vehicle in relation to the dead reckoning data, if the current driving speed of the vehicle exceeds the pre-determined limit speed, correspond substantially to the conditions specified above if the limit speed is exceeded.

In particular, the release is granted if the vehicle's own lane is detected using the lane marking on the corresponding side.

All specified variables and parameters are selected as an example and can be adjusted to an existing sensor system.

In relation to the dead reckoning data, the release is granted if a quality signal displays a pre-determined state, in particular the normal mode specified above. This state is present if a sufficient number of satellites, in particular more than 10 satellites, are recorded, and correction data is available. If fewer satellites are recorded, this state is described as a bridging mode, as described above.

The release is withdrawn if the state normal mode is not displayed for a longer period of time, e.g., for 15 seconds. A parameter value for this period of time can, for example, be derived using a coupling precision after 3 seconds of bridging mode, and then using the result of a controlled active fallback path function. By means of this parameter value, the required coupling precision should still just be reached in the longitudinal and transverse directions.

If the vehicle is driving at a current driving speed falling short of the pre-determined limit speed, the same conditions are present as when the limit speed is exceeded, with only the time parameters being different.

When errors arise in relation to the camera lane data and/or the dead reckoning data, the release is withdrawn or no longer granted.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle equipped for an automated driving operation, wherein in a regular operating mode of the automated driving operation, the vehicle is guided to a target position in an automated manner by a main control device, and in an emergency operating mode of the automated driving operation, the vehicle is moved into a safe stopping position in an automated manner by an auxiliary control device, the method comprising:

checking, by the main control device, a functional readiness of the auxiliary control device by checking whether data used by the auxiliary control device to locate the vehicle when guiding the vehicle fulfils pre-determined quality requirements, wherein the checking whether data used by the auxiliary control device to locate the vehicle when guiding the vehicle fulfils pre-determined quality requirements is based on decision criteria that are pre-determined depending on a limit speed in relation to a current driving speed of the vehicle; and making a decision regarding whether a release should be granted or withdrawn to grant or withdraw an allowance of the automated driving operation depending on the checked functional readiness of the auxiliary control device;

wherein the automated driving operation is only activated when the allowance of the automated driving operation has been granted, and the automated driving operation is deactivated when the allowance of the automated driving operation is withdrawn.

2. The method of claim 1, wherein dead reckoning data and determined camera lane data are checked with regard to the pre-determined quality requirements by the main control device, and wherein when the limit speed is fallen short of, the allowance of the automated driving operation is granted if the dead reckoning data or the camera lane data fulfils the pre-determined quality requirements.

3. The method of claim 1, wherein dead reckoning data and determined camera lane data are checked with regard to the pre-determined quality requirements by the main control device, and wherein when the limit speed is exceeded, the allowance of the automated driving operation is granted if both the dead reckoning data and the camera lane data fulfil the pre-determined quality requirements.

* * * * *